United States Patent [19]

Sato et al.

[11] Patent Number: 4,897,734

[45] Date of Patent: Jan. 30, 1990

[54] IMAGE PROCESSING APPARATUS

[75] Inventors: Yasushi Sato; Yoshiyuki Suzuki, both of Kawasaki; Tsukasa Kuge, Tokyo, all of Japan

[73] Assignee: Canon Kabushiki Kaisha, Tokyo, Japan

[21] Appl. No.: 923,026

[22] Filed: Oct. 24, 1986

[30] Foreign Application Priority Data

Oct. 28, 1985 [JP] Japan .................................. 60-240756
Oct. 28, 1985 [JP] Japan .................................. 60-240757
Oct. 28, 1985 [JP] Japan .................................. 60-240758

[51] Int. Cl.$^4$ .............................................. H04N 1/40
[52] U.S. Cl. ..................................... 358/448; 358/456; 358/410; 358/464; 332/109
[58] Field of Search ............... 358/280, 264, 282, 283, 358/296, 297, 298, 300, 302, 448, 486, 410, 464; 332/14

[56] References Cited

U.S. PATENT DOCUMENTS

| | | | |
|---|---|---|---|
| 3,294,896 | 12/1986 | Young, Jr. ........................... | 358/283 |
| 3,436,472 | 4/1969 | Kyte ..................................... | 358/283 |
| 3,911,480 | 10/1975 | Briscker .............................. | 358/283 |
| 3,916,096 | 10/1975 | Everett et al. ....................... | 358/283 |
| 4,196,451 | 4/1980 | Pellar .................................. | 358/283 |

Primary Examiner—Edward L. Coles, Sr.
Attorney, Agent, or Firm—Fitzpatrick, Cella, Harper & Scinto

[57] ABSTRACT

An image processing apparatus comprising a pixel data output for releasing pixel data, synthesis means for synthesizing a plurality of pixel data released from the pixel data output, a pattern signal generator for generating a pattern signal of a predetermined period, and means for forming a pulse-width modulated signal by utilizing the synthesized pixel data released from the synthesis means and the pattern signal.

29 Claims, 9 Drawing Sheets

IMAGE PROCESSING APPARATUS

BACKGROUND OF THE INVENTION

1. Field of the Invention

The present invention relates to an image processing apparatus for obtaining a reproduced image of a high quality.

2. Related Background Art

It has already been proposed to reproduce an image including halftones with a dither method or a density pattern method. However, in either method, a satisfactory tonal rendition can only be obtained with a large threshold value matrix, the use of which however, results in a low resolution or in an image texture with marked periodicity of the threshold matrixes. Consequently, an image of a high quality cannot be obtained.

In order to avoid the above-mentioned drawback, it is conceivable, in the dither method, to obtain multi-level dot information through the use of plural dither matrixes. However, such method requires a complex circuit structure in order to synchronize different dither matrixes, and inevitably gives rise to a large and complicated system. Consequently such method is associated with a certain limitation.

Processing of image information is preferably conducted in a multi-level state where the number of bits per pixel is large, but a limited number of bits per pixel is desirable for transmission or storage of image information.

Also it is already known that a correction of a digital input image signal to a desired contrast results in a loss in the number of tonal levels. In order to overcome such drawback it is possible to expand the dynamic range of the input image signal by increasing the number of bits of said image signal, but such increase in the amount of information of the input image signal not only results in the increase in the number of signal lines but also requires a complex and inevitably expensive structure for information storage or processing.

SUMMARY OF THE INVENTION

An object of the present invention is to eliminate the above-mentioned drawbacks.

Another object of the present invention is to provide an improvement on the image processing apparatus.

Still another object of the present invention is to provide an image processing apparatus capable of providing a reproduced image of a high image quality.

Still another object of the present invention is to provide an image processing apparatus capable of providing an excellent image with a simple structure.

Still another object of the present invention is to provide an image processing apparatus capable of providing an excellent tonal rendition with a relatively limited amount of information.

Still another object of the present invention is to provide an image processing apparatus capable of providing a reproduced image of a high resolution, a satisfactory tonal rendition and a high image quality.

Still another object of the present invention is to provide an image processing apparatus capable of providing a reproduced image of a high image quality with a high speed.

The foregoing and still other objects of the present invention will become fully apparent from the following description, which is to be taken in combination with the attached drawings.

DETAILED DESCRIPTION OF THE PREFERRED EMBODIMENTS

Now the present invention will be clarified in detail by description of the preferred embodiments thereof, shown in the attached drawings.

Figure 1:
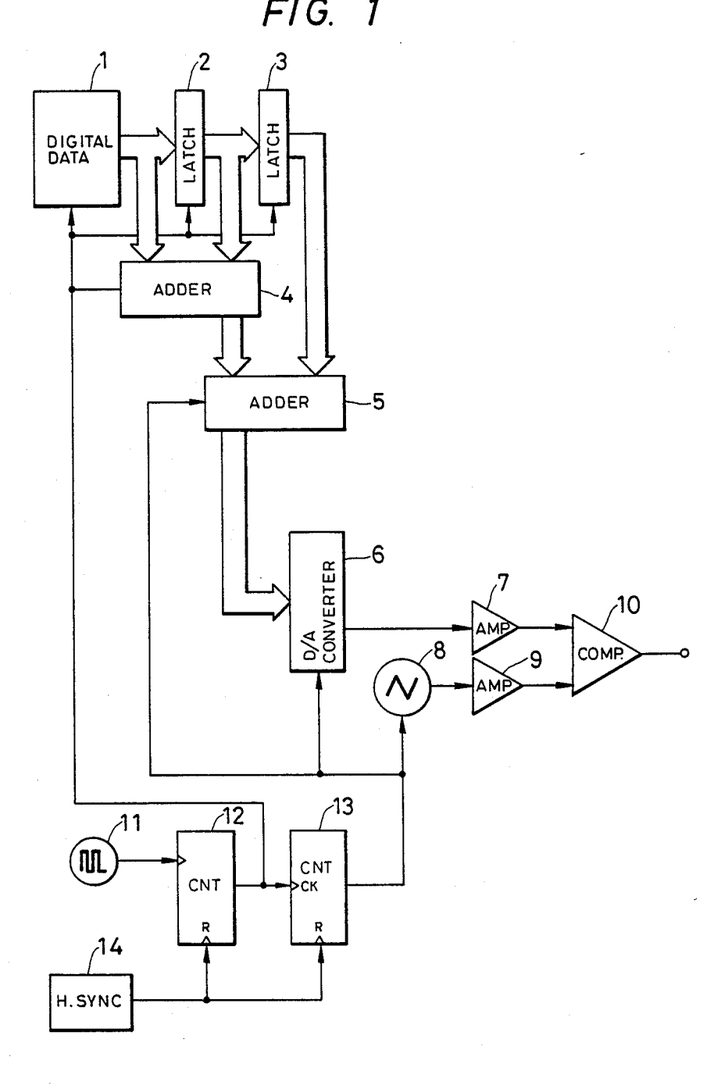
FIG. 1 is a block diagram of an image processing apparatus constituting a first embodiment of the present invention.

FIG. 1 is a block diagram of an image processing apparatus constituting a first embodiment of the present invention, wherein a digital data output device 1 effects A/D conversion on image data from an unrepresented CCD sensor or an unrepresented television camera, and releases digital data of a predetermined number of bits including density information. Said digital data may be temporarily stored in a memory or may be entered from an external device, for example, through communication. Said digital data output device 1 releases pixel data for one a line (e.g., one scan line or raster line) in consecutive manner, and the data of a first pixel are at first latched in a first latch circuit 2, and then latched in a second latch circuit 3 in response to succeeding image clock signals.

A first adding circuit 4 adds the image data latched in the first latch circuit 2 with the succeeding image data, and a second adding circuit 5 adds the data obtained by addition in the first adding circuit 4 with the data latched in the second latch circuit 3. In this manner the second adding circuit 5 releases a value obtained by adding the data of three consecutive pixels. In the first embodiment there are employed two adding circuits 4 and 5, but it is also possible to add the data of three consecutive pixels with a single adding circuit. Said added data of three consecutive pixels is then converted into an analog value by a D/A converter 6, and supplied, through an amplifier 7, to a terminal of a comparator 10.

A pulse pattern generator 8 generates a pulse pattern signal in synchronization with the data of three pixels. In the present embodiment said pulse pattern signal is triangular, but it may also be sawtooth shaped, trapezoidal or sinusoidal. The wave form of said pulse pattern signal is suitably selected according to the size of dot or the characteristics of the recording or display unit. Said pulse pattern generator 8 can be easily constructed, for example, with usual components such as resistors and capacitors. Said pulse pattern signal is matched with the dynamic range of the image data in an amplifier 9, and supplied to the other input terminal of the comparator 10. The analog image data supplied from the D/A converter 6 is compared in the comparator 10 with the pulse pattern signal, and is subjected to pulse width modulation for every three pixels. In the present embodiment, the digital image data released from the digital data output device 1 contains 4 bits or 17 levels per pixel, but the image signal after the addition in the second adding circuit 5 contains 49 levels per pixel. After pulse width modulation, said image signal of 49 levels is supplied, for example, to a modulating circuit for modulating a laser beam. Said laser beam is turned on and off according to the pulse width to form an image containing intermediate tones (or halftones) on an unrepresented recording medium.

In synchronization with horizontal synchronization signals generated by a horizontal synchronization signal generator 14 for respective lines, a counter 12 reduces the frequency of a reference clock signal, supplied from a reference clock generator 11, for example to ⅓ thereby generating an image clock signal which is employed as a transfer clock signal for image data transfer or a synchronization clock signal for the adding circuits. Said horizontal synchronization signal may be internally generated or supplied from the outside. In a case where the present invention is applied to a laser beam printer, said horizontal synchronization signal corresponds to the already known beam detection signal, indicating the beam scanning position. A ternary counter 13 reduces the frequency of the clock signal from the counter 12 further to ⅓ thereby generating a clock signal for the pulse pattern generator 8, adding circuit 5 and D/A converter 6.

FIG. 2 is a wave form chart showing various signals in the circuit shown in FIG. 1. Fig. 2A indicates the reference clock signal of a predetermined high frequency generated by the reference clock generator 11, FIG. 2B indicates the aforementioned horizontal synchronization signal, and FIG. 2C indicates the image clock signal obtained by reducing the frequency of the reference clock signal in the counter 12. As explained before, the pixel clock signal in Fig. 2C is synchronized with the horizontal synchronization signal. FIG. 2D indicates a pulse pattern synchronization clock signal, obtained by reducing the frequency of the image clock signal, from the counter 12, to ⅓ in the ternary counter 13. The clock signal FIG. 2D is utilized as a synchronization signal for pulse pattern generation and is supplied to the pulse pattern generator 8. FIG. 2E indicates an image signal obtained by direct D/A conversion of the output signal from the digital data output device 1, without the additions. In FIG. 2F, the broken line indicates the pixel data after addition of three consecutive pixels, while the solid line indicates the triangular signal from the pulse pattern generator 8, after amplification in the amplifier 9. In these charts the image density is higher at a lower position. The comparator 10 compares the added signal, as represented by the broken line in FIG. 2F with the pulse pattern signal, as represented by the solid line in FIG. 2F to obtain a binary pulse-width modulated signal as shown in FIG. 2G.

As explained above, in the present embodiment, the digital image data of three consecutive pixels are added, then converted into analog image data and compared with a triangular wave of a predetermined period. As the result there is obtained an almost continuous pulse width modulation enabling one to obtain a reproduced image of a satisfactory tonal rendition.

In the present embodiment, since the pulse pattern synchronization clock signal synchronized with the horizontal synchronization signal is formed from the reference clock signal of a frequency higher than that of the synchronization signal for pulse pattern generation, the fluctuation of the pulse patterns generated by the pulse pattern generator 8, for example the aberrations of the pulse patterns between the first and second lines, is equal to 1/24 of the cycle of the pulse pattern.

The use of pulse patterns of such reduced fluctuation enables almost continuous pulse width modulation of the density information, thus providing a reproduced image of a high image quality.

In the present embodiment, the pulse pattern is generated for every three image clock pulses, but it may also be generated more or less frequently, in consideration of the response speed, resolution or the like of the apparatus.

Figure 3:
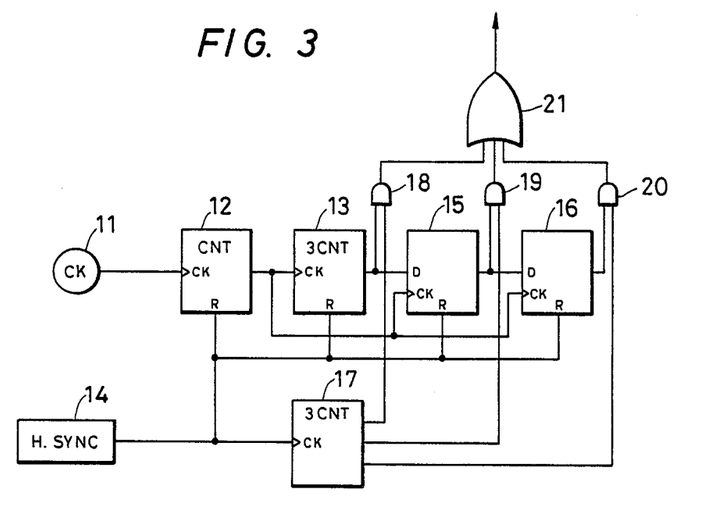
FIG. 3 is a circuit diagram of a second embodiment.

Also in the present embodiment, the pulse patterns are generated in the same manner on all lines, but it is preferable to displace the synchronization signal for pulse pattern generation by a pixel for each line. In this manner the center of each pulse modulated signal is displaced in succession from line to line, so that the output image macroscopically appears as a diagonal screen pattern which looks natural to the human eyes. Also, such method is desirable in consideration of the resolving power, since said centers of pulse-width modulated signals are more evenly distributed over the entire image. FIG. 3 is a block diagram of a second embodiment, capable of displacing the synchronization signal for pulse pattern generation by a pixel for every line in the above-explained manner.

In FIG. 3, components of equivalent functions as those in FIG. 1 are represented by same numbers. In the circuit shown in FIG. 3, the ternary counter 13 generates a pulse pattern synchronization clock signal for every three image clock pulses, in synchronization with the horizontal synchronization signal as explained before. D-flip-flops 15 and 16 generate synchronization signals which are respectively delayed by 1 and 2 image clock signals from said pulse pattern synchronization clock signal generated by the counter 13. In response to the signal from the horizontal synchronization signal generator 14, a ternary counter 17 generates three line gate signals, which are respectively supplied to AND gates 18–20. More specifically, in response to each horizontal synchronization signal, the output terminals of the counter 17 cyclically generate said gate signals which are supplied to the AND gates 18–20. In this manner the synchronization signal for pulse pattern generation is switched for every line. The synchronization clock signals supplied from the AND gates 18–20 are supplied, through an OR gate 21, to the pulse pattern generator 8.

Figure 2A:
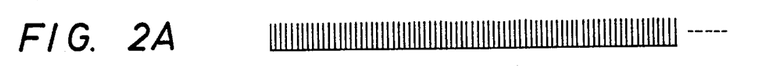
FIGS. 2A to 2G are wave form charts showing signals in the circuit shown in FIG. 1.
Figure 2B:
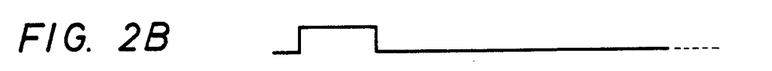
Figure 2C:
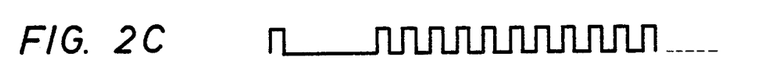
Figure 2D:
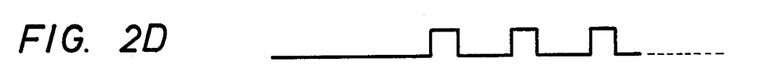
Figure 2E:
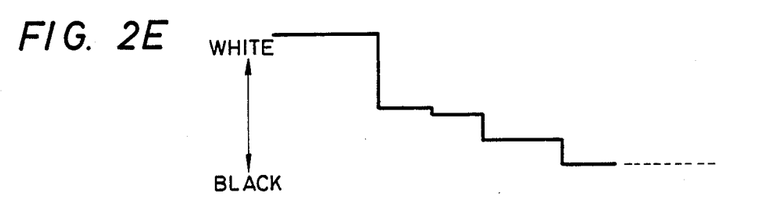
Figure 2F:
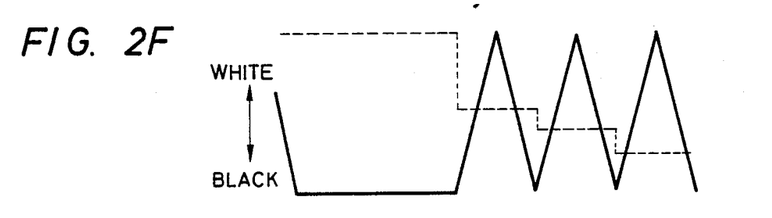
Figure 2G:
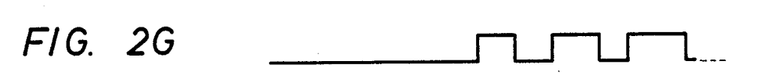
Figure 4A:
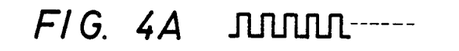
FIGS. 4A to 4D and FIGS. 5A to 5D are wave form charts showing signals in the circuit shown in FIG. 3.
Figure 4B:
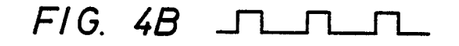
Figure 4C:
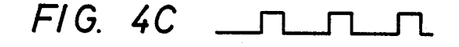
Figure 4D:
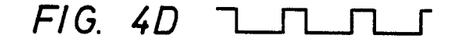
Figure 5A:
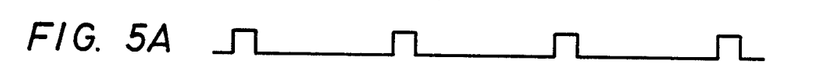
Figures 5B, 5C:
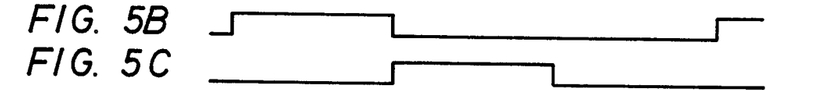
Figure 5D:
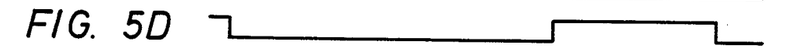

FIG. 4A indicates an image clock signal generated by the counter 12 and corresponds to the signal shown in FIG. 2C. FIGS. 4B, 4C and 4D respectively show the output clock signals from the ternary counter 13, flip-flop 15 and flip-flop 16. The clock signal shown in FIG. 4B corresponds to the clock signal shown in FIG. 2D. FIG. 5 shows the horizontal synchronization signal and the output signal from the ternary counter 17. In response to the horizontal synchronization signal shown in FIG. 5A, the ternary counter 17 generates three line gate signal shown in FIGS. 5B, 5C and 5D, of which one is selected in succession and supplied to the pulse pattern generator 8.

In this manner the circuit shown in FIG. 3 provides pulse patterns which are displaced by a pixel for every line, so that the centers of the pulse width modulated signals are displaced in succession from line to line.

Figure 6:
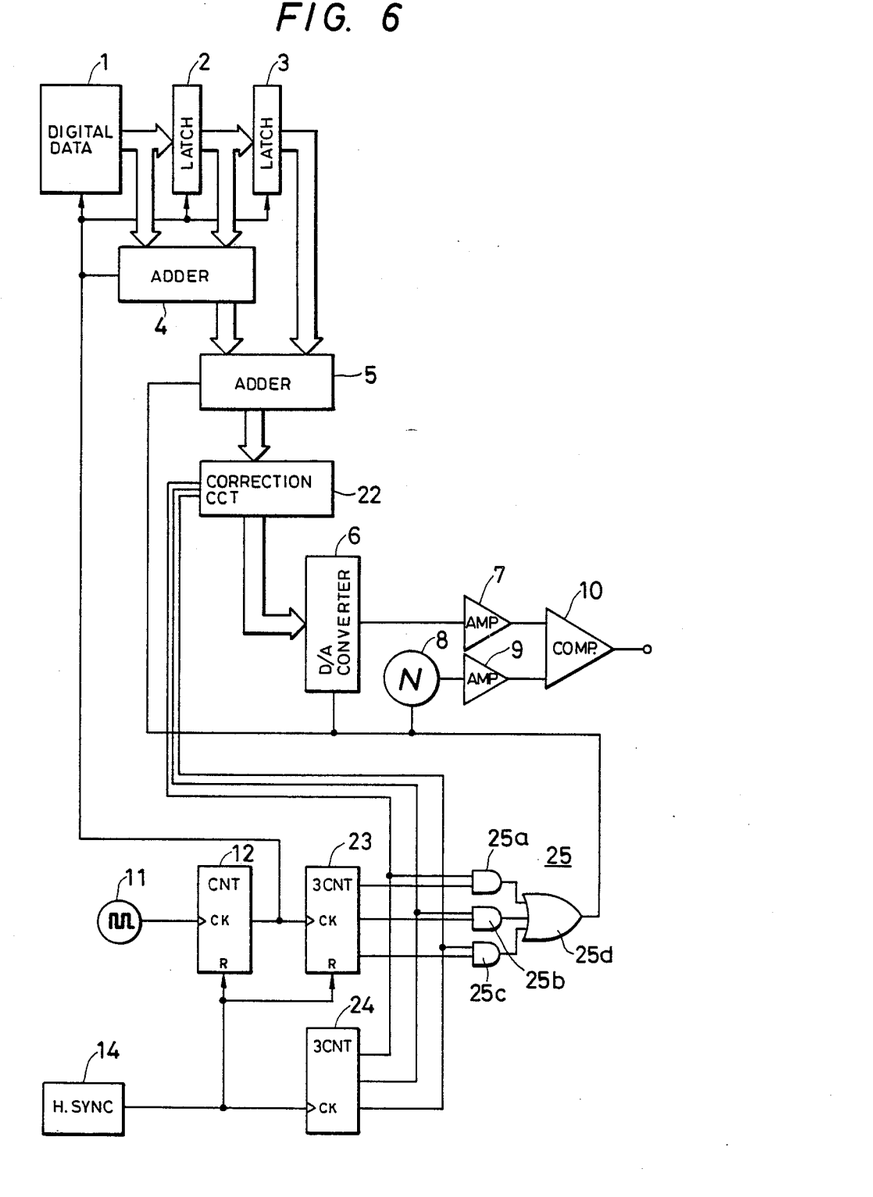
FIG. 6 is a block diagram of a third embodiment.

FIG. 6 shows a third embodiment of the present invention, wherein components equivalent to those in FIG. 1 are represented by the same numbers.

A digital data output device 1 effects A/D conversion on image data from an unrepresented CCD sensor or an unrepresented television camera, and releases digital data of a predetermined number of bits including density information. Said digital data may be temporarily stored in a memory or may be entered from an external device for example through communication. Said digital data output device 1 releases pixel data of a line in consecutive manner, and the data of a first pixel are at first latched in a first latch circuit 2, and then latched in a second latch circuit 3 in response to a succeeding image clock signal.

A first adding circuit 4 adds the image data latched in the first latch circuit 2 with the succeeding image data, and a second adding circuit 5 adds the data obtained by addition in the first adding circuit 4 with the data latched in the second latch circuit 3. In this manner the second adding circuit 5 releases a value obtained by adding the data of three consecutive pixels. In the present embodiment there are employed two adding circuits 4 and 5, but it is also possible to add the data of three consecutive pixels by means of a single adding circuit.

In the present third embodiment, the digital image data from the digital data output device 1 have 65 density levels, but the signal after the addition of three consecutive pixels in the adding circuit 5 has 193 density levels. The thus-added signal is subjected to a gamma correction in a correction circuit 22 composed of a correction map ROM. Said correction is conducted in different manner from line to line, and is repeated for every three lines. The corrected image signal is converted into analog data by the D/A converter 6, then corrected in amplitude by the amplifier 7 and supplied to a terminal of the comparator 10. On the other hand, the pulse pattern generator 8 generates a triangular pulse pattern synchronized with every three consecutive pixels, and said pulse pattern is matched, in the amplifier 9, with the dynamic range of the image signal and supplied to the other terminal of the comparator 10. Said pulse pattern generator 8 can be easily constructed with usual components such as resistors and capacitors. The comparator 10 compares the input image signal with the repeated triangular pulse pattern, thereby pulse-width modulating the image information of every three pixels and generating a pulse-modulated binary signal. After pulse width modulation, said image signal is supplied, for example, to a modulating circuit for modulating a laser beam. Said laser beam is turned on and off according to the pulse width to form an image containing intermediate tones on an unrepresented recording medium.

In synchronization with horizontal synchronization signal generated by the horizontal synchronization signal generator 14 for respective lines, the counter 12 reduces the frequency of the reference clock signal, supplied from the reference clock generator 12, for example to ⅛ thereby generating the image clock signal which is employed as the image clock signal for image data transfer. A ternary counter 23 reduces the frequency of said image or pixel clock signal further to ⅓, thereby generating three pulse pattern synchronization signals, mutually displaced by a pixel clock signal, for generating pulse patterns. The counters 12, 23 effect counting operations in synchronization with the horizontal synchronization signal. Also in response to the horizontal synchronization signal, a ternary counter 24 releases, in succession, three signals mutually spaced by the period of a line. Said signals are supplied to a gate 25 for selecting three pulses pattern synchronization clock signals supplied from the counter 23, and are also utilized for selecting the correction map for each line in the correction circuit 22.

FIG. 7 is a wave form chart showing various signals in the circuit shown in FIG. 6. FIG. 7A indicates the reference clock signal generated by the reference clock generator 11, and FIG. 7B indicates the horizontal synchronization signal. Said horizontal synchronization signal may be generated internally, or supplied from the outside. In a case where the present invention is applied to a laser beam printer, said horizontal synchronization signal corresponds to an already known beam detection signal indicating the scanning position of the beam. FIG. 7C indicates the pixel clock signal released from the counter 12, in synchronization with the horizontal synchronization signal. As explained before, said pixel clock signal is formed by reducing the frequency of the reference clock signal to 1/8. The ternary counter 23 further reduces the frequency of the pixel clock shown in FIG. 7C to ⅓ to generate pulse pattern synchronization clock signal shown in FIGS. 7D-7F of every three consecutive pixels, which are mutually displaced by a pixel clock and of which one is selected for each line and supplied to the pulse pattern generator 8 through AND gates 25a-25c and an OR gate 25d. FIG. 7G shows a case where the digital image signal from the digital data output device 1 is directly subjected to D/A conversion. In FIGS. 7H-7J, broken lines indicate signals obtained by addition of pixel data of three pixels in the adding circuit 5, correction in the correction circuit 22 and the D/A conversion in the D/A converter 6. The correction of the added signal is conducted in respectively different manners for different lines, so that three different signals are obtained after correction even when same input image signal is entered in three lines. The broken lines in FIGS. 7H-7J indicate a case of same signals supplied in three consecutive lines, and it will be understood that the forms of image signals become different in different lines after the correction. In these charts the image density is higher at a lower position.

Figure 7A:
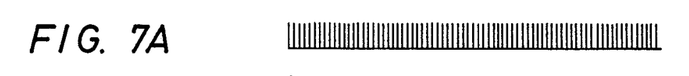
FIGS. 7A to 7M are wave form charts showing signals in the circuit shown in FIG. 6.
Figure 7B:
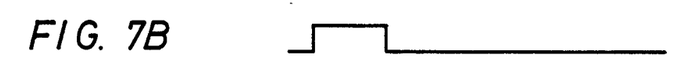
Figure 7C:
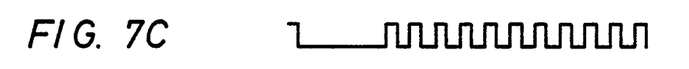
Figure 7D:
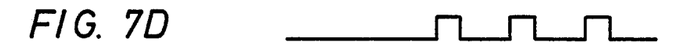
Figure 7E:
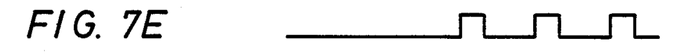
Figure 7F:
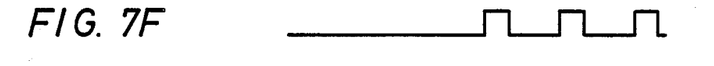
Figure 7G:
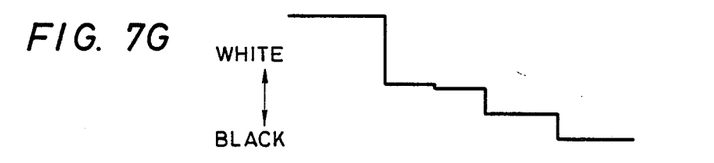
Figure 7H:
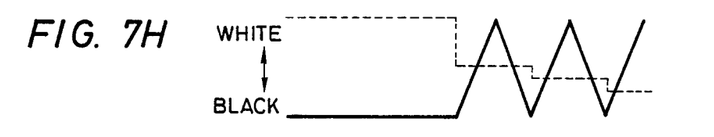
Figure 7I:
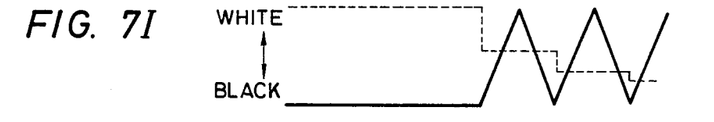
Figure 7J:
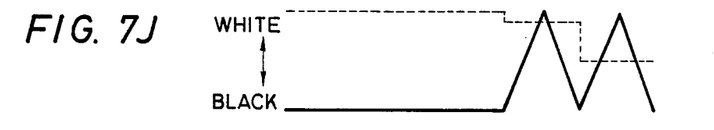
Figure 7K:
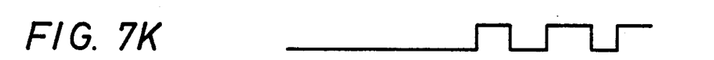
Figure 7L:
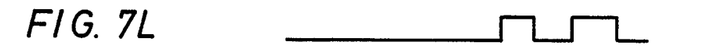
Figure 7M:
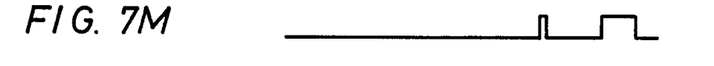

The solid lines in FIGS. 7H-7J indicate triangular pulse patterns released from the pulse pattern generator 8. As will be apparent from these charts, the triangular patterns are displaced by a pixel clock from line to line. The comparator 10 compares the corrected image signal with the pulse pattern to generate the pulse-width modulated binary data as shown in FIGS. 7K–7M. The comparator 10 releases the signal shown in FIGS. 7K, 7L and 7M respectively in the first, second and third lines.

As explained in the foregoing, in the third embodiment, the image data obtained by adding the data of three consecutive pixels are corrected, then converted into analog image data and compared with a triangular wave of a predetermined frequency. As the result there is provided an almost continuous pulse width modulation, and there is obtained a reproduced image of satisfactory tonal rendition (or tonality).

Also in said third embodiment, since the number of density levels is increased by the addition of information of plural pixels, a gamma correction does not reduce the number of density levels and a smooth tonal rendition is obtained.

Furthermore, in said third embodiment, in which the synchronization signal for pulse pattern generation is successively displaced by a pixel from line to line, the centers of the pulse-width modulated signals are likewise displaced, so that the resulting image macroscopically appears as a diagonal screen pattern which is natural to the human eyes. Also such pattern is desirable in consideration of the resolving power since such centers are more evenly distributed over the entire image.

Though the pulse pattern employed in the third embodiment is triangular, it can also be of sawtooth shape, sinusoidal or trapezoidal. The form of the pulse pattern is selected in consideration of the linearity of the output device to the pulse width and the mode of growth of each dot. For example, each dot grows on both sides in the case of a triangular or sinusoidal pattern, while each dot grows on one side only in the case of a saw-tooth pattern.

Figure 8:
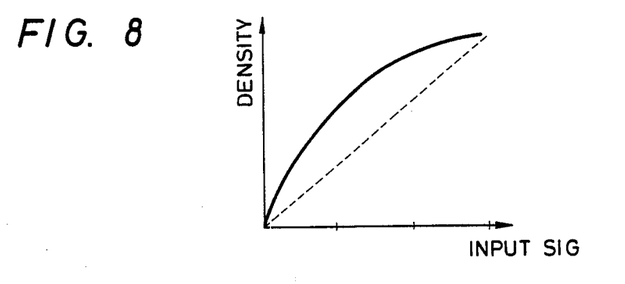
FIG. 8 is a chart showing the relationship between input image signal and record density in the absence of gamma (contract) correction.
Figure 9:
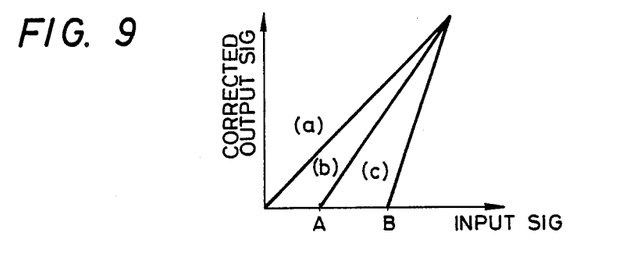
FIG. 9 is a chart showing examples of gamma correction for each line in the third embodiment.
Figure 10:
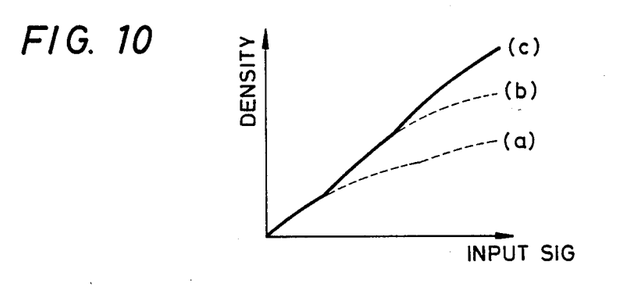
FIG. 10 is a chart showing the relationship between input image signal and record density after gamma correction.

In the following there will be explained the gamma correction effected in the correction circuit 22. FIG. 8 shows an example of the relationship between the input image signal and the recording density, obtained where the image signal is multi-width modulated and recorded on a laser beam printer without correction. In this case, if a same pulse-width modulation is applied, the density rises steeply in the beginning but only gradually increases afterwards in any of three lines, and the linearity is far from desirable. A broken line in Fig. 8 indicates an ideal relationship between the input image signal and the record density. In the third embodiment, correction is conducted in a different manner for each line and is repeated for every three lines. In this example the correction circuit 22 is constructed in such a manner that an input-output relationship shown in FIG. 9(line (a)) is obtained for the first line, a relationship shown in FIG. 9(line (b)) is obtained for the second line, and a relationship shown in FIG. 9(line (c)) is obtained for the third line. In this manner there is obtained a relationship of a very good linearity as shown by Fig. 10(line (c)). In FIG. 10(line (a)) is obtained when the correction line shown in FIG. 9(line (a)) is solely used, and a relationship shown in FIG. 10(line (b)) is obtained when the correction line shown in FIGS. 9(line (a)) and 9(line (b)) are combinedly used.

Figure 11:
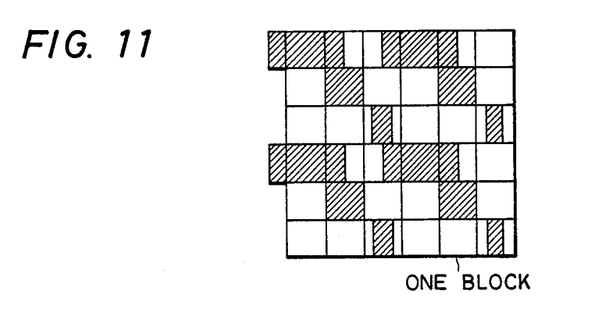
FIG. 11 is a view showing an example of an output pattern according to the third embodiment.

FIG. 11 shows an example of output pattern obtained with the circuit of the third embodiment. In this example the input data have a constant density over the entire area, but pulse-width modulation as represented by hatched areas is obtained due to different correction from line to line. Also as explained before, the centers of growth of dots are displaced by a pixel between the neighboring lines. In FIG. 11 a square block corresponds to a pixel.

In the foregoing explanation of the third embodiment, the pulse pattern is generated for every three pixel clock pulses, but its frequency can be suitably increased or decreased. Also the number of pixels to be together added is not limited to three but can be suitably determined, in consideration of the response speed or resolving power of the apparatus.

It is also possible to select different cycle periods for the pulse pattern generation and for the addition of pixel data.

Also in the foregoing description, the pulse patterns are displaced by a pixel between the neighboring lines, but the amount of such displacement may be selected to be larger than or equal to zero. In the case of zero displacement, the dot pattern appears as vertical lines.

Also, in the foregoing description, the same correction is repeated for every three lines, but said number of lines can be suitably selected. Also it is possible to treat plural pixels as a block (which can be an entire line if desired), and to apply different corrections to different blocks, repeating the same correction for every predetermined number of blocks. It is furthermore possible to apply different corrections for different pixels. Furthermore, the gamma correction may be made selectable. As an example, the characteristic line may be made adjustable between points A and B in FIG. 9.

Furthermore, the gamma correction may be made prior to the addition of data, instead of after the addition of data as explained before.

Figure 12:
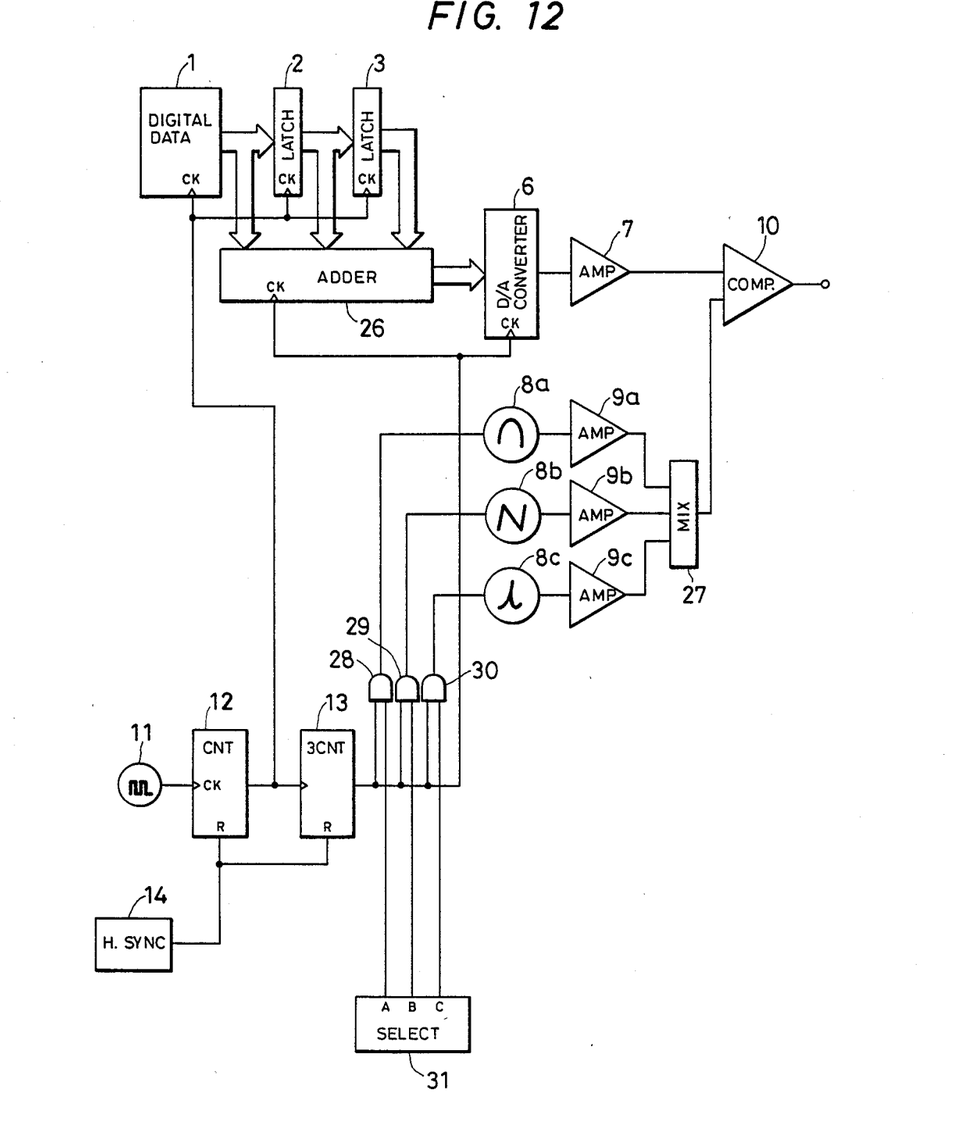
FIG. 12 is a block diagram of a fourth embodiment of the image processing apparatus.

FIG. 12 shows a fourth embodiment of the present invention, wherein components equivalent functions to those in FIG. 1 are represented by same numbers.

A digital data output device effects A/D conversion on image data from an unrepresented CCD sensor or an unrepresented television camera, and releases digital data of a predetermined number of bits including density information. Said digital data may be temporarily stored in a memory or may be entered from an external device for example through communication. Said digital data output device 1 releases pixel data of a line in consecutive manner, and the data of a first pixel are at first latched in a first latch circuit 2, and then latched in a second latch circuit 3 in response to a succeeding pixel clock signal. The data latched in first and second latch circuits 2, 3 and the data of a succeeding pixel, i.e., the data of three consecutive pixels, are added in an adding circuit 26.

In the present embodiment, the digital image data released from the output device 1 contain 65 density levels, but the signal added in said adding circuit 26 contains 193 density levels. The thus-added signal is converted into an analog value in the A/D converter 6, then corrected in amplitude by the amplifier 7, and supplied to a terminal of the comparator 10. On the other hand, pulse pattern generators 8a, 8b, 8c selectively generate three pulse patterns synchronized with said three pixels. Said pulse pattern generators can be easily constructed with usual components such as resistors and capacitors. Said pulse patterns are respectively amplified in amplifiers 9a, 9b, 9c and are supplied, through a mixing circuit 27, to the other terminal of the comparator 10. The comparator 10 compares the input image signal with the pulse patterns repeatedly generated, thereby pulse-width modulating the image information of every three pixels and releasing a corresponding pulse-width modulated binary signal. Said modulated image signal is supplied, for example, to a modulating circuit for modulating a laser beam. Said laser beam is turned on and off according to the width of the pulses to form an image containing intermediate tones on an unrepresented recording medium.

The pulse pattern generators 8a, 8b and 8c respective generate a sinusoidal pulse pattern, a triangular pulse pattern and an inverted sinusoidal pulse pattern.

The counter 12 reduces the frequency of the reference clock signal, supplied from the reference clock generator 11, for example to ½, thus forming the pixel clock signal for transferring pixel data. The ternary counter 13 further reduces the frequency of said pixel clock signal to ⅓, thus generating the pulse pattern synchronization clock signal for generating the pulse patterns. In this manner the ternary counter 13 generates synchronization pulses for every three pixels, in synchronization with the horizontal synchronization signal generated for each line by the horizontal synchronization signal generating circuit 14. Said horizontal synchronization signal may be generated internally or entered from the outside. In case the present invention is applied to a laser beam printer, the horizontal synchronization signal corresponds to an already known beam detection signal indicating the scanning position of the beam. The pulse pattern synchronization clock signal supplied from the ternary counter 13 is supplied, either through a gate 28, 29 or 30, to one of the pulse pattern generator 8a, 8b, 8c, according to the selection of one of the terminals A, B and C of a gamma selector 31.

When said terminal A of the gamma selector 31 is selected, said pulse pattern synchronization clock signal is supplied, through the AND gate 28, to the pulse pattern generator 8a.

Likewise, when the terminal B is selected, said clock signal is supplied to the pulse pattern generator 8b, and, when the terminal C is selected, said clock signal is supplied to the pulse pattern generator 8c.

The terminals A, B, C of the gamma selector 31 may be manually selected by the operator or automatically selected for example by a control circuit such as a CPU according to the characteristics of an output device.

FIG. 13 is a wave form chart showing various signals in the circuit shown in FIG. 12. In FIG. 13A indicates the reference clock signal generated by the reference clock generator 11. FIG. 13B indicates the aforementioned horizontal synchronization signal, and FIG. 13C represents the pixel clock signal generated by the counter 12 in synchronization with said horizontal synchronization signal. FIG. 13D represents the pulse pattern synchronization clock signal, obtained by reducing the frequency of said pixel clock signal to ⅓ in the ternary counter 13. FIG. 13E indicates the analog level when the image signal from the digital data output device 1 is directly subjected to D/A conversion, wherein the image density is higher at a lower position. In the present embodiment, due to the addition of data of three consecutive pixels, the analog image signal obtained from the D/A converter 6 assumes a form as represented by a broken line in FIGS. 13F–13H. The solid lines in FIGS. 13F–13H indicate pulse patterns which are generated respectively by the pulse pattern generators 8a, 8b, 8c and of which one is selected in the present embodiment. FIGS. 13I–13K represent the output signals of the comparator 10, indicating a fact that the character of the binary data is varied according to the selection of the pulse pattern generator even if a same image signal is supplied to the comparator 10.

Figure 13A:
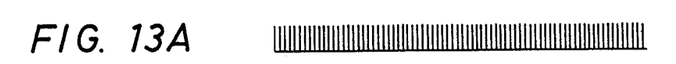
FIGS. 13A-13K are wave form charts showing signals in the circuit shown in FIG. 12.
Figure 13B:
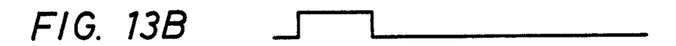
Figure 13C:
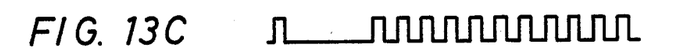
Figure 13D:
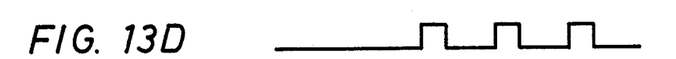
Figure 13E:
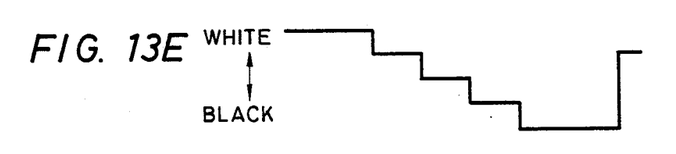
Figures 13F, 13G:
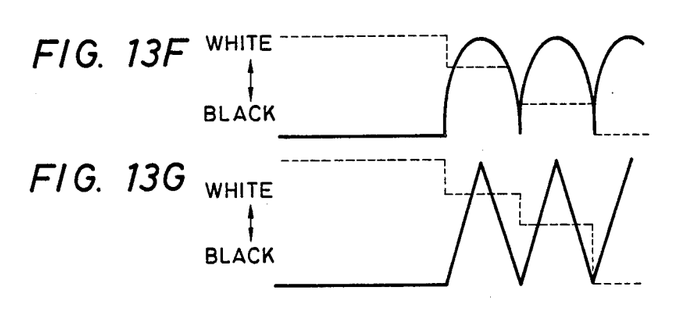
Figure 13H:
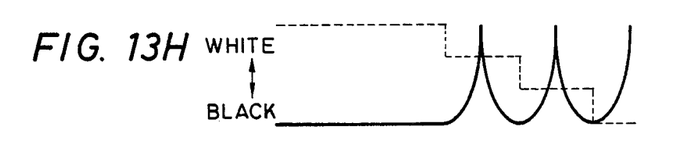
Figure 13I:
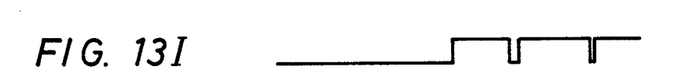
Figure 13J:
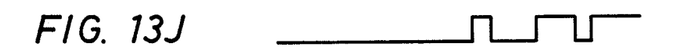
Figure 13K:
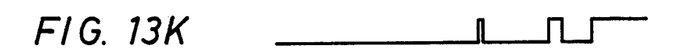

More specifically the output binary signal assumes a form as shown in FIG. 13I, 13J or 13K respectively when the pulse pattern generator 8a, 8b or 8c is selected.

As explained in the foregoing, in the present embodiment, the digital image data of three consecutive pixels are added, then converted into analog image data and compared with a selected pulse pattern of a predetermined frequency. In this manner there is obtained an almost continuous pulse width modulation, leading to a reproduced image of satisfactory tonal rendition.

Also, in the present embodiment, since the pulse pattern synchronization clock signal synchronized with the horizontal synchronization signal is formed with a reference clock signal of a frequency higher than that of the synchronization signal for pulse pattern generation, the fluctuation of the pulse patterns generated by the pulse pattern generator, for example, the aberration of the pulse patterns between the first and second lines becomes equal to 1/24 of the cycle period of the pulse pattern.

The use of pulse patterns of such reduced fluctuation enables substantially continuous pulse width modulation of the density information, thus allowing obtain a reproduced image of a high quality.

Figure 14:
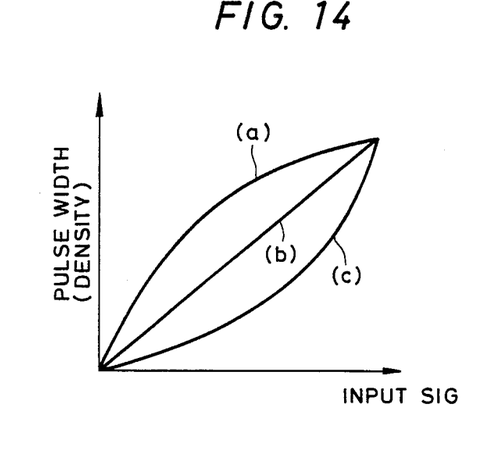
FIG. 14 is a chart showing a conversion characteristic of a pulse width modulated signal in the fourth embodiment.

FIG. 14 shows the relationship between the input image signal and the modulated pulse width or the image density. In FIG. 14, curve (a) FIG. 14A represents a characteristic when a sinusoidal pulse pattern is selected. Also curves (b) and (c) respectively correspond to the cases of triangular and inverted sinusoidal pulse patterns. Also a finer selection of gamma or contract is rendered possible by selecting variable non-linear amplifiers as the amplifiers 9a, 9b and 9c in FIG. 13.

As explained in the foregoing, the fourth embodiment is capable of selecting the pulse pattern for example according to the characteristics of an output device to be employed, and allows to effect a gamma correction without loss in the number of density levels and to achieve an image reproduction with a high quality.

In the fourth embodiment, the pulse pattern is generated at a cycle period of every three pixels, but said cycle period may be selected shorter or longer. Also the number of pixels to be added is not limited to three but can be suitably determined, in consideration of the response speed, resolution etc. of the apparatus.

It is also possible to select different cycle periods for the pulse pattern generation and for the addition of pixel data.

Also, in the foregoing description of the fourth embodiment, the pulse patterns are generated in the same manner in all lines, but it is similarly desirable to displace the generation of pulse patterns by a pixel between the neighboring lines. In this manner the centers of growth of pulses are displaced from line to line, so that the output pattern macroscopically appears as a diagonal screen pattern which is natural to the human eyes. Also such manner is desirable in consideration of the resolving power, since said centers of growth of pulses are more evenly distributed throughout the entire image. Furthermore, the selection of the pulse pattern need not be the same throughout the entire image but may be varied in a part of the image or from line to line.

Figure 15:
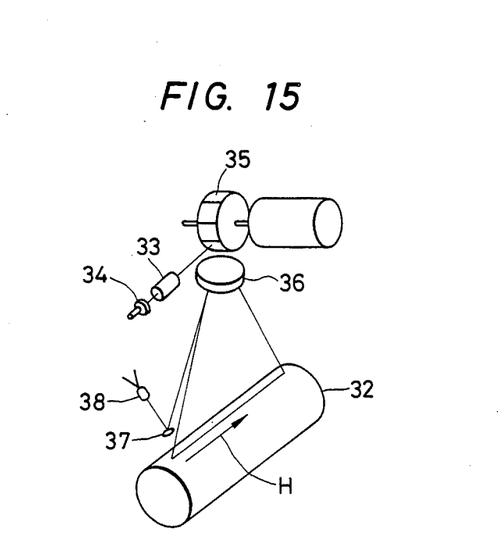
FIG. 15 is a schematic view of a laser beam printer in which the present invention is applicable.

FIG. 15 is a schematic perspective view of a scanning optical system of a laser beam printer (raster scanning print unit) in which the present invention is applicable. The optical system is provided with a semiconductor laser capable of emitting a laser beam modulated according to the aforementioned pulse width modulated signal. The light beam modulated by a semiconductor laser 34 is collimated by a collimating lens 33 and is deflected by a rotary polygon mirror 35 having plural reflecting faces. The deflected light beam is focused onto a photosensitive drum 32, thus an f-θ lens. In said scanning operation, the light beam is reflected, at the start position of a scanning line, by a mirror 37 and is guided to a beam detector 38, which generates a beam detection signal. As already known, said signal is utilized as the horizontal synchronization signal. As explained in the foregoing, the horizontal synchronization signal in the present embodiment is composed of said beam detection signal.

The beam detection signal is detected in each line of laser beam scanning and serves as a timing signal for sending the pulse-width modulated signal to the semiconductor laser.

The present invention is applicable to various image processing apparatus such as facsimile or laser beam printer.

The present invention is not limited to the foregoing embodiments but is subjected to various modifications and variations within the scope and spirit of the appended claims.

What we claim is:

1. An image processing apparatus comprising:
    pixel signal generating means for generating a pixel signal;
    combining means for combining a plurality of pixel signals generated by said pixel signal generating means to output a combined pixel signal, said combining means forming a combined pixel signal having a greater number of tonal levels than said plurality of pixel signals by combining said plurality of pixel signals; and
    means for forming a pulse-width modulated signal by utilizing the combined pixel signal output from said combining means.

2. An image processing apparatus according to claim 1, wherein said pulse-width modulated signal forming means comprises pattern signal generating means for generating a pattern signal of a predetermined period, and digital/analog conversion means for converting the combined pixel signal, supplied by said combining means, into an analog combined pixel signal, and said pulse-width modulated signal forming mans is adapted to form the pulse-width modulated signal by utilizing the analog combined pixel signal and the pattern signal.

3. An image processing apparatus according to claim 2, wherein said pulse-width modulated signal forming means comprises comparator means adapted to generate the pulse-width modulated signal by comparing the analog combined pixel signal with the pattern signal.

4. An image processing apparatus according to claim 3, wherein said combining means is adapted to add the plurality of pixel signals, and said pattern signal generating means is adapted to generate a triangular wave of predetermined period.

5. An image processing apparatus according to claim 2, further comprising synchronization signal generating means for generating a synchronization signal associated with an image forming operation, and reference clock generating means for generating a reference clock signal of a predetermined frequency; wherein said pattern signal generating means is adapted to form a clock signal for generating the pattern signal by dividing the frequency of the reference clock signal based on the synchronization signal.

6. An image processing apparatus according to claim 5, further comprising means for forming an image by line-scanning on a recording medium with a beam in accordance with the pulse-width modulated signal; wherein the synchronization signal is a signal indicating the scanning position of said beam.

7. An image processing apparatus according to claim 6, wherein said pattern signal generating means is adapted to alter the timing of generation of the pattern signal for each scanning line.

8. An image processing apparatus according to claim 2, further comprising image forming means for forming an image by lines on a recording medium in accordance with the pulse-width modulated signal generated by said pulse-width modulated signal forming means, said image forming means including means for generating a synchronizing signal for each signal on the recording medium, said pattern signal generating means generating the pattern signal of a predetermined period in accordance with the synchronizing signal.

9. An image processing apparatus according to claim 8, wherein said image forming means scans lines on the recording medium with a beam in accordance with the pulse-width modulated signal, thereby forming the image on the recording medium, and wherein said synchronizing signal generating means includes detecting means for detecting a scanning position of the beam, and generates the synchronizing signal on the basis of a detection output from said detecting means.

10. An image processing apparatus according to claim 1, wherein said pulse-width modulated signal forming means comprises pattern signal generating means for generating plural types of pattern signals, and means for selecting a pattern signal to be used from among the said plural types of pattern signals; and
    wherein said pulse-width modulated signal forming means forms the pulse-width modulated signal on the basis of the combined pixel signal output by said combining means and the pattern signal selected by said selection means.

11. An image processing apparatus according to claim 1, wherein said pixel signal generating means sequentially generates a pixel signal composed of a predetermined number of bits representing intensity level.

12. An image processing apparatus comprising:
    pixel data generating means for generating pixel data;
    combining means for combining a plurality of pixel data generated by said pixel data generating means to output combined pixel data, said combining means forming combined pixel data having a greater number of tonal levels than said plurality of pixel data by combining said plurality of pixel data;
    characteristic converting means for converting a characteristic of the combined pixel data output by said combining means and for producing converted pixel data therefrom; and
    means for forming a pulse-width modulated signal on the basis of the converted pixel data output by said characteristic converting means.

13. An image processing apparatus according to claim 12, wherein said pulse-width modulated signal forming means comprises means for generating a pattern signal of a predetermined period, and said pulse-width modulated signal forming means is adapted to form the pulse-width modulated signal on the basis of the pattern signal and the converted pixel data.

14. An image processing apparatus according to claim 13, further comprising digital/analog conversion means for converting the converted pixel data into an analog converted pixel signal, wherein said pulse-width modulated signal forming means is adapted to form the pulse-width modulated signal by utilizing the analog converted pixel signal and the pattern signal.

15. An image processing apparatus according to claim 14, wherein said pulse-width modulated signal forming means comprises comparator means adapted to generate the pulse-width modulated signal by comparing the analog converted pixel signal with the pattern signal.

16. An image processing apparatus according to claim 15, wherein said combining means is adapted to add the plurality of pixel data and pattern signal generating means is adapted to generate a triangular wave of predetermined period.

17. An image processing apparatus according to claim 13, further comprising synchronization signal generating means for generating a synchronization signal associated with an image forming operation, and reference clock generating means for generating a reference clock signal of a predetermined frequency; wherein said pattern signal generating means is adapted to form a clock signal for generating the pattern signal by dividing the frequency of the reference clock signal based on the synchronization signal.

18. An image processing apparatus according to claim 17, further comprising means for forming an image by line-scanning on a recording medium with a beam in accordance with the pulse-width modulated signal; wherein the synchronization signal is a signal indicating the scanning position of said beam.

19. An image processing apparatus according to claim 18, wherein said pattern signal generating means is adapted to alter the timing of generation of the pattern signal for each scanning line.

20. An image processing apparatus according to claim 17, wherein said converting means is adapted to change the converting mode of the combined pixel data according to the synchronization signal.

21. An image processing apparatus according to claim 13, further comprising image forming means for forming an image by lines on a recording medium in accordance with the pulse-width modulated signal generated by said pulse-width modulated signal forming means, said image forming means including means for generating a synchronizing signal for each line on the recording medium, and said pattern signal generating means generating the pattern signal predetermined period in accordance with the synchronizing signal.

22. An image processing apparatus according to claim 21, wherein said image forming means scans lines on the recording medium with a beam in accordance with the pulse-width modulated signal, thereby forming the image on the recording medium, and wherein said synchronizing signal generating means includes detecting means for detecting a scanning position of the beam, and generates the synchronizing signal on the basis of a detection output from said detecting means.

23. An image processing apparatus according to claim 12, wherein said pixel data generating means sequentially generates a pixel data composed of a predetermined number of bits representing a density level.

24. An image processing apparatus comprising:
pixel signal generating means for generating pixel signals;
combining means for combining a plurality of pixel signals generated by said pixel signal generating means, said combining means forming a combined pixel signal having a greater number of tonal levels than said plurality of pixel signals by combining said plurality of pixel signals; and
gradation processing means for gradation processing the combined pixel signal output by said combining means.

25. An image processing apparatus according to claim 24, wherein said gradation processing means comprises pulse-width modulated signal forming means for forming a pulse-width modulated signal by utilizing the combined pixel signal output by said combining means.

26. An image processing apparatus according to claim 24, further comprising characteristic converting means for converting a characteristic of the combined pixel signal output by said combining means and for producing a converted pixel signal therefrom, wherein said gradation processing means gradation processes the converted pixel signal output by said characteristic converting means.

27. An image processing apparatus according to claim 26, wherein said characteristic converting means periodically switches a converting mode with which the combined pixel signal is converted.

28. An image processing apparatus according to claim 27, further comprising image forming means for forming an image by lines on a recording medium in accordance with a reproduction signal generated by said gradation processing means, said image forming means including means for generating a synchronizing signal for each line on the recording medium, wherein said characteristic converting means switches the converting mode of the combined pixel signal in accordance with the synchronizating signal.

29. An image processing apparatus according to claim 24, wherein said pixel signal generating means sequentially generates a pixel signal composed of a predetermined number of bits representing a density level.

* * * * *

UNITED STATES PATENT AND TRADEMARK OFFICE
CERTIFICATE OF CORRECTION

PATENT NO. : 4,897,734
DATED : January 30, 1990
INVENTOR(S) : YASUSHI SATO, ET AL.

Page 1 of 3

It is certified that error appears in the above-identified patent and that said Letters Patent is hereby corrected as shown below:

ON TITLE PAGE:

IN [56] REFERENCES CITED

U.S. PATENT DOCUMENTS, "3,294,896  12/1986" should read --3,294,896  12/1966-- and "Briscker" should read --Brucker--.

COLUMN 1

Line 14, "which" should read --which,--.

COLUMN 2

Line 52, "a" should be deleted.

COLUMN 3

Line 44, "$\frac{1}{3}$ thereby" should read --$\frac{1}{3}$, thereby--.
Line 60, "clock signal FIG. 2D" should read --clock signal in FIG. 2D--.

COLUMN 5

Line 11, "gate signal" should read --gate signals--.

UNITED STATES PATENT AND TRADEMARK OFFICE
CERTIFICATE OF CORRECTION

PATENT NO.  : 4,897,734
DATED       : January 30, 1990
INVENTOR(S) : YASUSHI SATO, ET AL.

Page 2 of 3

It is certified that error appears in the above-identified patent and that said Letters Patent is hereby corrected as shown below:

COLUMN 6

Line 8, "reference clock generator 12," should read --reference clock generator 11,--.

COLUMN 8

Line 33, "components" should read --components of--.

COLUMN 9

Line 29, "generator 8a, 8b, 8c," should read --generators 8a, 8b, 8c,--.

COLUMN 10

Line 23, "obtain" should read --to obtain--.
Line 27, "FIG. 14A" should be deleted.

COLUMN 11

Line 6, "thus an" should read --thus scanning the same, by means of an imaging lens 36, called an--.

UNITED STATES PATENT AND TRADEMARK OFFICE
CERTIFICATE OF CORRECTION

PATENT NO. : 4,897,734
DATED : January 30, 1990
INVENTOR(S) : YASUSHI SATO, ET AL.

It is certified that error appears in the above-identified patent and that said Letters Patent is hereby corrected as shown below:

COLUMN 13

Line 16, "pattern signal" should read --said pattern signal--.
Line 51, "signal predetermined" should read --signal of a predetermined--.

Signed and Sealed this

Thirtieth Day of July, 1991

Attest:

HARRY F. MANBECK, JR.

*Attesting Officer*     *Commissioner of Patents and Trademarks*